United States Patent
Wang et al.

(10) Patent No.: US 7,113,462 B2
(45) Date of Patent: Sep. 26, 2006

(54) METHOD FOR ADJUSTING THE WRITING SPEED OF A CD DRIVE

(75) Inventors: Yi-Shih Wang, Taipei (TW); Yung-Yu Chang, Yun-Lin (TW)

(73) Assignee: Lite-On It Corp., (TW)

( * ) Notice: Subject to any disclaimer, the term of this patent is extended or adjusted under 35 U.S.C. 154(b) by 657 days.

(21) Appl. No.: 10/124,171

(22) Filed: Apr. 17, 2002

(65) Prior Publication Data

US 2003/0067853 A1 Apr. 10, 2003

(30) Foreign Application Priority Data

Oct. 5, 2001 (TW) .............................. 90124615 A

(51) Int. Cl.
*G11B 15/46* (2006.01)
(52) U.S. Cl. .................. 369/47.39; 369/53.37
(58) Field of Classification Search ............ 369/47.39, 369/47.33, 47.28, 47.38, 47.48, 44.32, 53.34, 369/30.17, 47.29, 47.44
See application file for complete search history.

(56) References Cited

U.S. PATENT DOCUMENTS

| 5,825,733 A * | 10/1998 | Ogawa | 369/47.48 |
| 6,246,650 B1 * | 6/2001 | Kuroiwa | 369/47.38 |
| 2001/0053112 A1 * | 12/2001 | Matsui | 369/47.3 |

* cited by examiner

*Primary Examiner*—Thang V. Tran
*Assistant Examiner*—Kim-Kwok Chu
(74) *Attorney, Agent, or Firm*—Raymond Sun

(57) ABSTRACT

A method of adjusting the write speed of a CD drive includes writing data from a CD drive to a disk at a first speed during a first preset time. If, at the end of the first preset time, the data error rate at the first speed is larger than the error allowance upper limit for the first preset time, then writing of the data will be completed at the first speed. However, if at the end of the first preset time, the data error rate at the first speed is smaller than the error allowance upper limit for the first preset time, then the writing speed will be adjusted to a second higher speed. The same process can be repeated for the second higher speed.

1 Claim, 4 Drawing Sheets

METHOD FOR ADJUSTING THE WRITING SPEED OF A CD DRIVE

BACKGROUND OF THE INVENTION

1. Field of the Invention

The present invention relates to a method for dynamically adjusting the writing speed of a compact disk (CD) drive, and in particular, relates to a method for dynamically adjusting the writing speed in accordance with the data error rate of the data to be written onto a disk.

2. Description of the Prior Art

The current writing speed of laser compact disks that may be burned (i.e., written) once (CD-R) in CD drives that are available on the market has reached 24×, and a continued increase in the writing speed for future CD drives is expected. However, compact disks made by different manufacturers do not have completely identical features, so that the data writing conditions can also be different at the same write speeds. At a given data write speed, it is possible that the compact disk of one brand is able to completely and correctly carry out the data writing action, while the compact disk of another brand may experience problems. For example, data may be omitted, or read outs may be impossible even though the writing is completed, among other unexpected situations.

When a compact disk is made in a factory, a helical pregroove is carved onto its surface, which covers the whole disk from an inside circle radiating outwardly at an interval of about 1.6 micrometers. Taking a 12 cm disk as an example, the groove will cover the whole disk with about 20,000 circles. An optical head is guided by means of this groove to radiate a laser beam on to the groove with the result that a sequence of pits and lands of different patterns are formed, with the patterns of the pits and lands obtained in accordance with codes of the data to be written. The groove is carved with some slight wobbles, by which the whole helical groove is etched in continuous time. By analyzing the wobble groove, the absolute time in pregroove (ATIP) of the compact disc can be obtained. ATIP is well-known in the art, and essentially provides information about the minute, second and frame being accessed or written. In other words, ATIP functions like an addressing means.

Using the obtained ATIP, it is possible to determine (i) the starting point for the time when the writing operation is carried out, and (ii) the ending point for the time available for the writing. For example, a location that is about 25 mm from the axis of the compact disk is approximately the zero point of the ATIP of the compact disk (i.e., 00 min, 00 sec, 00 block). The total duration of the ATIP is the total writable time of the compact disk that can generally be seen on the compact disk. However, this duration changes along with the linear velocity of the compact disk when the compact disk is spinning. As an example, when the linear velocity of a compact disk is 1.2 m/sec, the total time available for writing on this compact disk is about 74 min. When the linear velocity of the compact disk is increased to 1.4 m/sec, the total time available for writing on this compact disk is reduced to only about 64 min.

Even though the ATIP provides some information (such as the starting and ending points for data writing and the like), it does not provide certain relevant information. For example, ATIP does not provide information about the optimum writing speed needed by the compact disk to correctly and completely write data, and whether or not the data can be correctly read after the writing process is completed. As a result, when the CD drive is carrying out the data writing process, it must rely completely on the writing speed specified by the user. This can result in failure of the entire writing process and the subsequent waste of compact disks. For example, if a user selects a speed of 24× for writing to a disk, but the disk is only a 16× disk, the writing operation may fail, or the quality of the written data may be poor. This is because the 16× disk cannot support a writing speed of 24×.

Thus, there still remains a need for a method for adjusting the writing speed of a CD drive to minimize write failures and to improve the quality of the written data.

SUMMARY OF THE DISCLOSURE

It is an object of the present invention is to provide a method of adjusting the writing speed of a CD drive to minimize write failures and to improve the quality of the written data.

In order to accomplish the objects of the present invention, the present invention provides a method of adjusting the write speed of a CD drive. According to the method, data is written from a CD drive to a disk at a first speed during a first preset time. If, at the end of the first preset time, the data error rate at the first speed is larger than the error allowance upper limit for the first preset time, then writing of the data will be completed at the first speed. However, if at the end of the first preset time, the data error rate at the first speed is smaller than the error allowance upper limit for the first preset time, then the writing speed will be adjusted to a second higher speed. The same process can be repeated for the second higher speed.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a method for dynamically adjusting the writing speed of a compact disk. By setting in advance at least one error allowance upper limit, and by comparing it to the data write error rate which is detected and calculated for the CD drive when it is operating at a given write speed, the write speed of the CD drive can be dynamically adjusted so that the success rate of the writing operation is increased.

In particular, the method of the present invention dynamically determines the actual write speed of the CD drive. An error allowance upper limit is preset for each different write speed. Thereafter, the data error rate when the CD drive is operating at a first write speed is calculated and compared with the error allowance upper limit for that first write speed. If the data error rate is smaller than the error allowance upper limit at the first write speed, the write speed of the CD drive can be adjusted to a second higher speed. On the other hand, if the data error rate is larger than the error allowance upper limit for that first write speed, then the CD drive continues to write data at that first write speed. The same process is carried out for the second write speed, and for subsequent higher write speeds.

As a result, when the controller of the CD drive detects that, at a certain write speed, the data error rate of the writing process is larger than the preset error allowance upper limit at that write speed, the write speed of the CD drive is not allowed to continue to increase, thereby minimizing the possibility of additional data write errors, or even the failure of the writing process. On the other hand, when the controller of the CD drive detects that, at a certain write speed, the data error rate of the writing process is smaller than the preset error allowance upper limit at that write speed, the write speed of the CD drive can be increased when a preset ATIP of the CD drive is reached. In other words, the present invention allows the write speed to adjusted upwardly if the data error rate at a lower speed is within a tolerable range.

Figure 1:
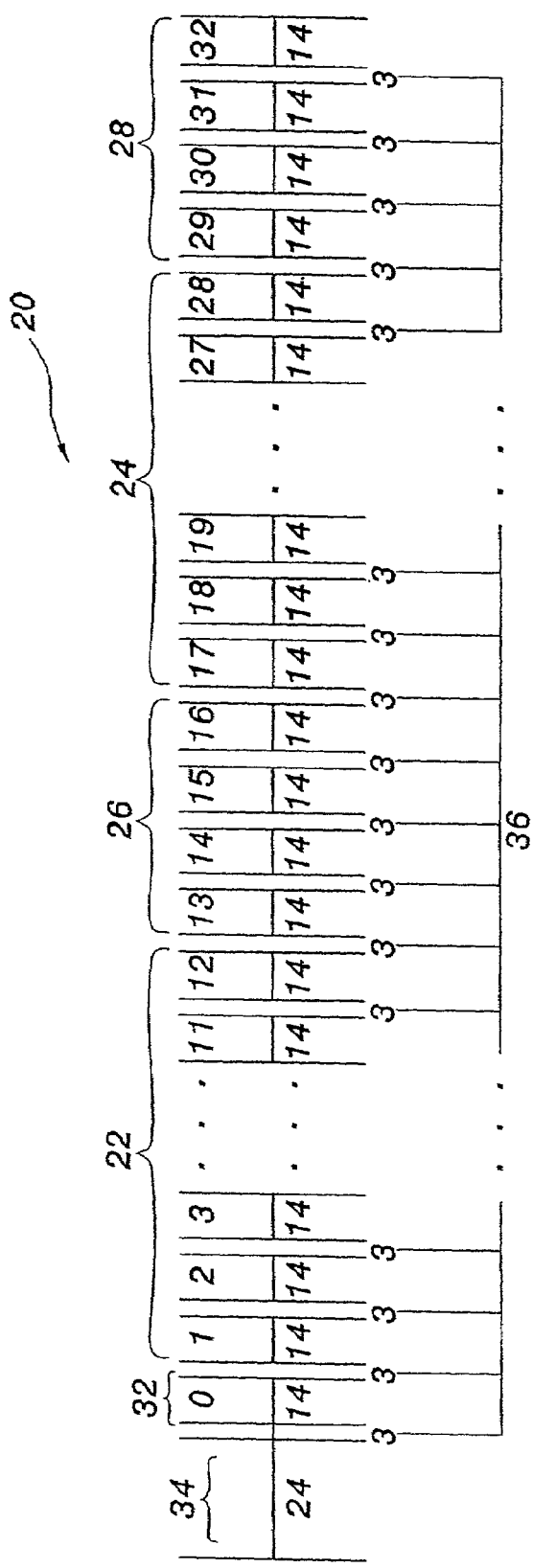
FIG. 1 illustrates a data signal that can be stored in a compact disk.

FIG. 1 is a diagram of a non-limiting example of a data signal 20 that is written onto a disk. Data signal 20 is an example of a voice signal, and includes two data bytes 22 and 24, a Q parity 26, a P parity 28, a subcode 32 and a sync word 34. Each data byte 22 and 24 includes digital bit data of 12 bytes, Q parity 26 and P parity 28 each includes digital bit data of 4 bytes, and subcode 32 includes digital bit data of 1 byte. When data bytes 22 and 24 are added to Q parity 24, P parity 26 and subcode 32, a digital bit data with a data length of 33 bytes can be obtained (i.e., the 0–32 section as shown in FIG. 1). This digital bit data with a data length of 33 bytes is processed with eight-to-fourteen modulation (EFM) and an EFM code of 462 bytes can be obtained. Parity 34 does not need EFM, and its length is still 24 bits. Between each of the bytes in data bytes 22 and 24, Q parity 24, P parity 26, subcode 32 and sync word 34, there are three merge bits 36, and in this way the data length of the entire data signal 20 totals 588 bits (i.e., 462+24+34*3=588). When the data length of data signal 20 equals 588 bits, it is kept unchanged; only the disk has different writing capacity during a writing operation due to different linear velocity of the disk.

Figure 2:
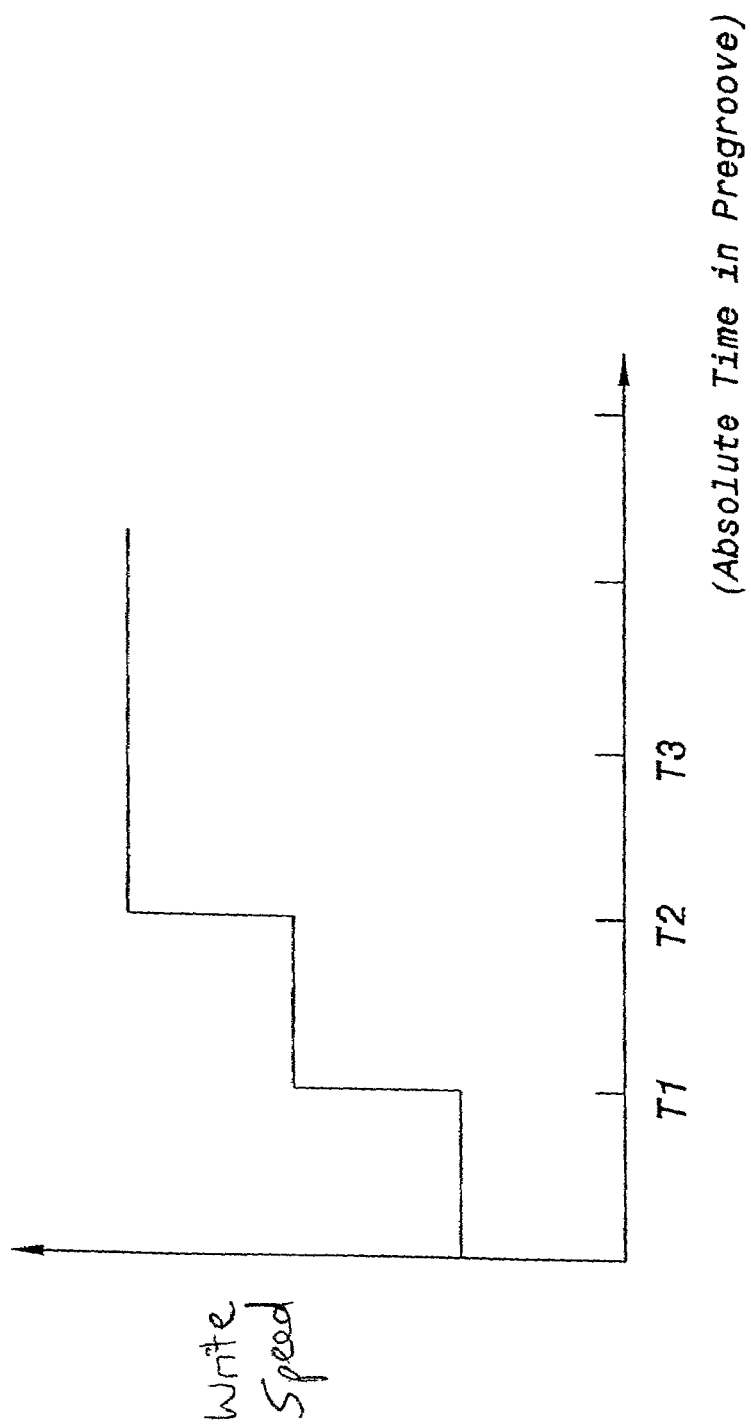
FIG. 2 is a graph illustrating an ideal situation of the relationship between the absolute time in pregroove (ATIP) and the write speed of the disk.
Figure 3:
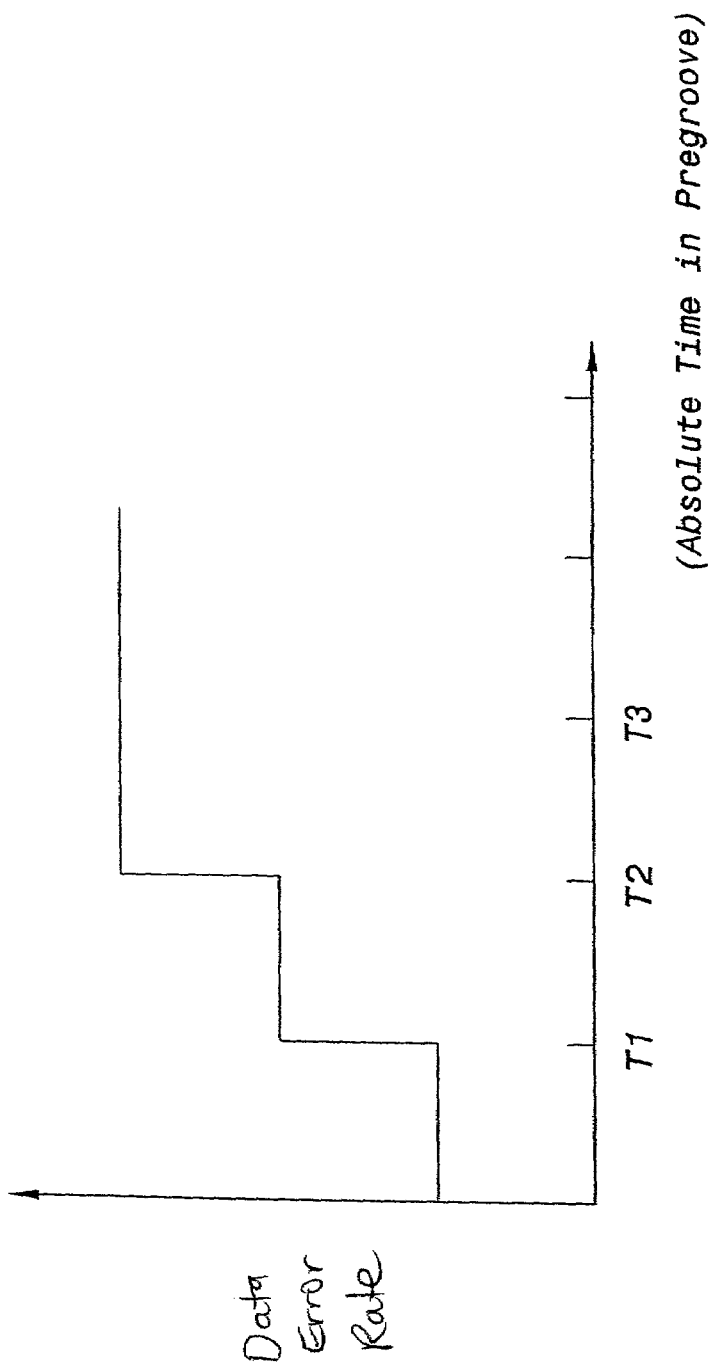
FIG. 3 is a graph illustrating an ideal situation of the relationship between the absolute time in pregroove (ATIP) and the data error rate of the disk.

Referring now to FIGS. 2 and 3, FIG. 2 is a diagram of the relationship between the absolute time in pregroove (ATIP) of the disk and the write speed of the CD drive with respect to the disk. FIG. 3 is a diagram of the relationship between the ATIP of the disk and the data error rate that corresponds to the ATIP of the disk. Both FIGS. 2 and 3 depict ideal situations for the sake of simplicity, because in practice, neither the change in the write speed of the disk in the CD drive, nor the change in the relationship between the data error rate occurring in the disk and the ATIP of the disk, can be carried out without delay at a certain ATIP. However, in general, as shown in FIGS. 2 and 3, an increase in the ATIP of the disk is accompanied by a corresponding increase in the write speed of the CD drive, as well as a corresponding increase in the error incident rate during data writing.

Figure 4:
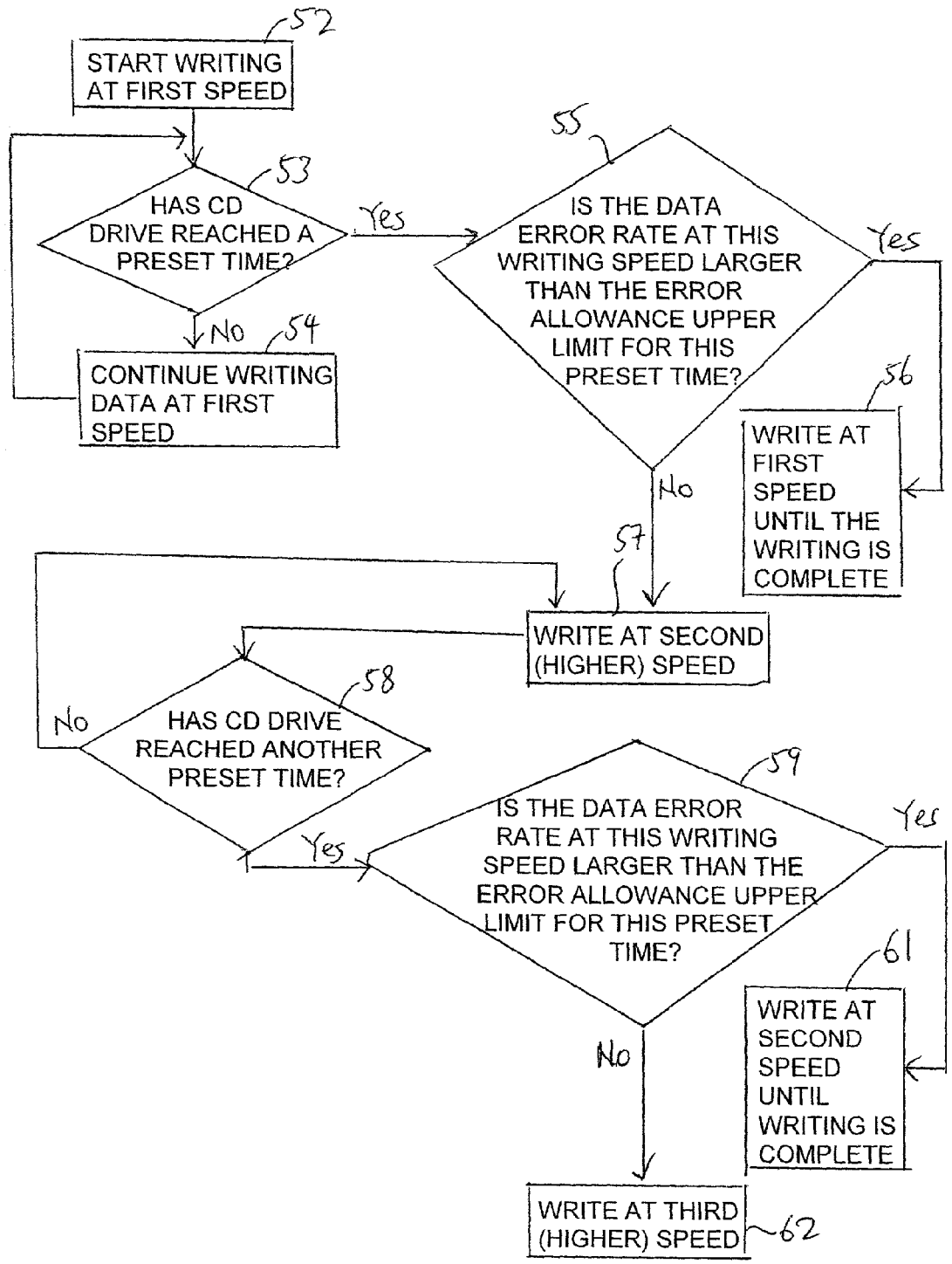
FIG. 4 is a flow chart illustrating a method according to one embodiment of the present invention.

FIG. 4 is a flow chart of a method 50 for dynamically adjusting the write speed of a CD drive according to one embodiment of the present invention. The method 50 has the following steps:

Step 52: The CD drive starts writing at a given (e.g., first) speed (e.g., 16×). Processing then proceeds to step 53.

Step 53: In this step, it is determined whether the CD drive has reached a (e.g., first) preset time. This preset time can be any predetermined amount of time calculated from the time when the writing begins. If the preset time has been reached, processing proceeds to Step 55, otherwise processing will proceed to Step 54.

Step 54: In this step, the CD drive continues to write data to the disk at the existing (e.g., first) write speed. Processing returns to step 53.

Step 55: In this step, it is determined whether the data error rate at the existing (e.g., first) write speed is larger than the error allowance upper limit that has been preset for this (e.g., first) preset time. If the data error rate at the existing (e.g., first) write speed is larger than the error allowance upper limit for this preset time, then processing proceeds to Step 56, otherwise processing proceeds to Step 57.

Step 56: In this step, the existing writing operation will continue at the existing (e.g., first) write speed until the writing is completed. This is because an increase in the write speed will only continue to increase the number of data write errors, which can lead to poorer write results and possibly even the failure of the writing process. The process then ends here.

Step 57: In this step, the write speed is increased to the next (e.g., second) higher speed (e.g., 24×), and writing continues at this (second) higher speed. Since the data error rate is smaller than the error allowance upper limit at this preset time, an increase in the write speed can speed up the completion of the entire writing operation without significantly risking the potential for increased write errors, thereby increasing the writing efficiency. Processing then proceeds to step 58.

Step 58: In this step, it is determined whether the CD drive has reached a (e.g., second) preset time. This preset time can be any predetermined amount of time calculated from the time when writing at the existing (e.g., second) speed begins. If the preset time has been reached, processing proceeds to Step 59, otherwise processing returns to Step 57 in that the writing continues at the same (second) write speed.

Step 59: In this step, it is determined whether the data error rate at the existing (e.g., second) write speed is larger than the error allowance upper limit that has been preset for this (e.g., second) preset time. If the data error rate at the existing (e.g., second) write speed is larger than the error allowance upper limit for this preset time, then processing proceeds to Step 61, otherwise processing proceeds to Step 62.

Step 61: In this step, the existing writing operation will continue at the existing (e.g., second) write speed until the writing is completed. The process then ends here.

Step 62: In this step, the write speed is increased to the next (e.g., third) higher speed, and writing continues at this (third) higher speed. Processing then ends, or if additional higher write speeds are available, processing can continue by repeating steps 58, 59, 61 and 62 for each subsequent higher speed.

In steps 55 and 59, there are a number of well-known techniques for determining whether the data error rate exceeds a predetermined error allowance upper limit. As one non-limiting example, it is possible to write C1 and C2 flags into the written data as the CD drive writes data to the disk. The controller can then select a portion (e.g., 1 minute) of the preset time (e.g., 5 minutes) and read the data that had been written to the disk during that portion (1 minute) of time, while trying to determine if all the flags have been correctly written. Each incorrectly-written flag can be considered to be an error, and the data error rate can be determined by determining how many flags are incorrect. For example, a threshold of X C1 flags can be set for writing data at a first write speed (e.g., 16×) and a threshold of Y C2 flags can be set for writing data at a second write speed (e.g., 24×). If no more than X number of C1 flags are found during writing in the first speed, then writing can be adjusted from the first speed to the second speed. Then, if no more than Y number of C2 flags are found during writing in the second speed, then writing can be adjusted from the second speed to the third speed. As an example, X and/or Y can even be set to be zero.

The present invention can operate based on any number of different write speeds. For example, the flowchart in FIG. 4 illustrates the possibility of using up to three write speeds, but any number of (including just two) write speeds can be used. If only two write speeds are used, then steps 58, 59, 61 and 62 can be omitted, and the first write speed can be the minimum write speed, and the second write speed can be the maximum write speed of the CD drive. When the CD drive is operating at its maximum write speed, it will continue to operate at the maximum write speed until the writing process is completed, regardless of whether or not any future calculated data error rate(s) at the existing preset time is larger or smaller than the corresponding preset error allowance upper limit. Similarly, when the CD drive is operating at its minimum write speed, and if the calculated data error rate is larger than the preset error allowance upper limit at the existing preset time, then the CD drive will continue to operate at the minimum write speed until the writing process is completed.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of adjusting the write speed of a CD drive, comprising:
   a. writing data from a CD drive to a disk at a first speed;
   b. if, at the end of a first preset time, the data error rate at the first speed is smaller than an error allowance upper limit for the first preset time, then writing data from the CD drive to the disk at a second speed that is faster than the first speed; and
   d. if, at the end of a second preset time, the data error rate at the second speed is smaller than an error allowance upper limit for the second preset time, then writing data from the CD drive to the disk at a third speed that is faster than the second speed.

* * * * *